Aug. 25, 1925.
J. A. JOHNSON
COTTON CHOPPER
Filed May 27, 1924
1,551,398
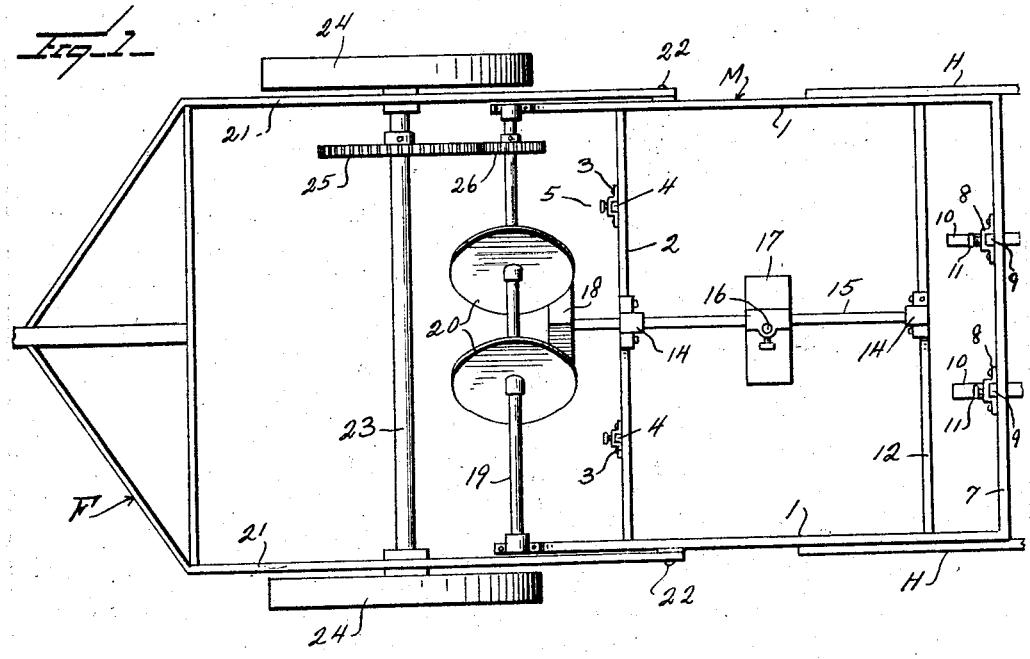
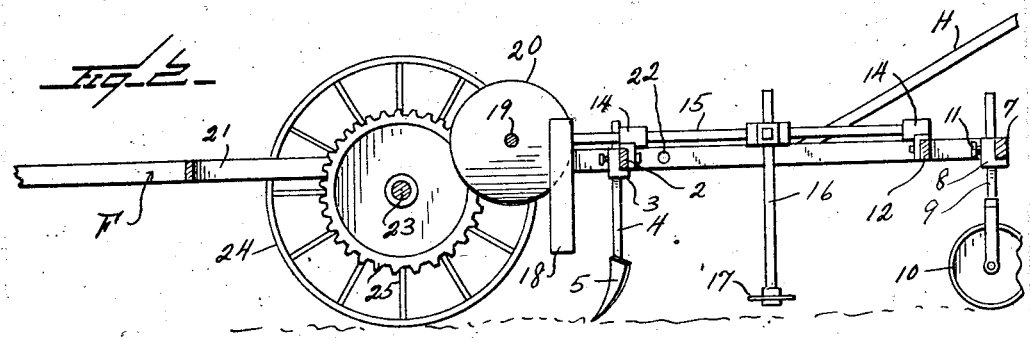
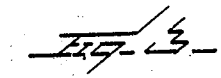
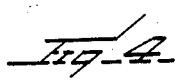
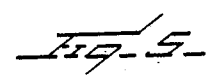
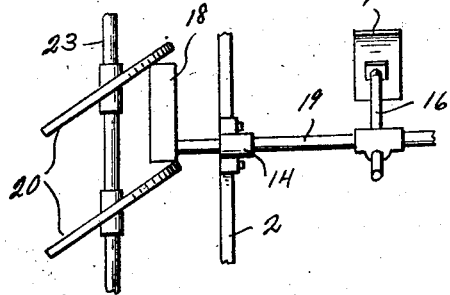
Inventor
J. A. Johnson
By Watson E. Coleman
Attorney Patented Aug. 25, 1925.

1,551,398

UNITED STATES PATENT OFFICE.

JAMES ANDREW JOHNSON, OF SHREVEPORT, LOUISIANA.

COTTON CHOPPER.

Application filed May 27, 1924. Serial No. 716,243.

*To all whom it may concern:*

Be it known that I, JAMES A. JOHNSON, a citizen of the United States, residing at Shreveport, in the parish of Caddo and State of Louisiana, have invented certain new and useful Improvements in Cotton Choppers, of which the following is a specification, reference being had to the accompanying drawings.

This invention relates to certain improvements in cotton choppers and it is an object of the invention to provide a novel and improved device of this general character including a main frame carrying a ground working member and a front frame pivotally engaged with the main frame whereby said frames are capable of relative vertical movement so that the desired action of the ground working member is assured irrespective of unevenness in the surface of ground over which the device is travelling.

It is also an object of the invention to provide a novel and improved device of this general character including a cotton chopper mounted for swinging movement in a direction transverse of the direction of travel of the machine and wherein said chopper is operatively engaged with a supporting or traction wheel together with means for rendering the chopper inactive during the travel of the device.

The invention consists in the details of construction and in the combination and arrangement of the several parts of my improved cotton chopper whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan of a cotton chopper constructed in accordance with an embodiment of my invention;

Figure 2 is a longitudinal vertical sectional view taken through the device as illustrated in Figure 1, with certain of the parts in elevation;

Figure 3 is a fragmentary view in top plan with the hoe in a second position;

Figure 4 is a fragmentary view in perspective of the operating member carried by the rock shaft;

Figure 5 is a fragmentary view in elevation of the hoe.

As disclosed in the accompanying drawings, M denotes a main frame preferably rectangular in form and which has its side members 1 connected substantially midway thereof by the transverse beam 2. Suitably engaged with the beam 2 at opposite sides of its center are the brackets 3 through which are directed the vertically disposed shanks 4 carrying the cultivator blades or plows 5. Each of the shanks 4 is capable of vertical adjustment and is maintained in its desired position by the clamping member 6 herein disclosed as a set screw threaded through the bracket 3 and engaging the shank 4.

Suitably engaged with the rear end member 7 of the frame M at opposite sides of the center thereof are the brackets 8 through which are directed the vertically disposed shanks 9. Rotatably engaged with the lower end portion of each of the shanks 9 is a gauge wheel 10. Each of the shanks 9 is also capable of vertical adjustment and is maintained in its desired position by a set screw 11 threaded through the bracket 8 and engaging the shank 9. The rear portion of the frame M has operatively engaged therewith upwardly disposed handle members H, the particular location of the wheels 10 leaving the operator free of the weight of the machine other than may be required in guiding the same.

The frame M adjacent the rear cross member 7 is provided with another cross member 12 and said cross members 2 and 12 at substantially the centers thereof rotatably support, as at 14, the rock shaft 15. The shaft 15 extends forwardly of the member 2 a desired distance. Depending from the shaft 15 and at a desired distance between the cross members 2 and 12 is a shank 16 to the lower end portion of which is operatively engaged the ground working member or hoe 17.

The forward end portion of the shaft 15 is provided with a head 18 substantially V-shaped in elevation with its apex upwardly disposed. The frame M at the forward portion thereof rotatably supports a transversely disposed shaft 19 provided at opposite sides of its center with the cam members or discs 20 the periphery of one of which being substantially at all times in contact with the head 18 at opposite sides of the apex so that as the shaft 19 rotates the shaft 15 will be rocked to assure the hoe 17 effectively cutting out plants in a row as the machine travels therealong.

The front frame F is substantially U-shaped in plan and has the free end portions of its side members 21 pivotally engaged, as at 22, with the side members 1 of the main frame M at a point inwardly of the forward ends of the members 1. By this arrangement it will be thus understood that the frames M and F are capable of relative swinging movement in a vertical plane. The side members 21 of the frame F rotatably support the driving axle or shaft 23 to the extremities of which are suitably fixed the supporting wheels 24. This shaft or axle 23 has also fixed thereto a gear 25 which is adapted under normal conditions to mesh with a gear 26 carried by the shaft 19 hereinbefore referred to so that under normal conditions the axle or shaft 23 serves as a driving member to effect the desired swinging or oscillating of the hoe 17.

It will be understood, however, that upon relative swinging movement of the frames M and F the gears 25 and 26 will be disengaged so that the hoe or member 17 will be rendered inoperative. This relative swinging movement of the frames may be readily obtained through the medium of the handle members H hereinbefore referred to.

From the foregoing description it is thought to be obvious that a cotton chopper constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A cotton chopper comprising a portable frame, a rock shaft disposed in the direction of travel of the frame and supported thereby, a chopper element carried by the rock shaft, a substantially V-shaped head carried by the rock shaft, a driven shaft carried by the frame, cam members carried by said driven shaft and having their peripheral portions contacting with the head at opposite sides of its apex to rock the first named shaft upon rotation of the driven shaft, and means for driving the driven shaft.

2. A cotton chopper comprising two hingedly connected frames capable of independent swinging movement, a traction wheel carried by one of the frames, a movable chopper element carried by the second frame, coacting means carried by both of the frames whereby the chopper element is operated from the traction wheel, and a gauge element depending from the second frame, said coacting operating means being rendered inoperative upon the swinging of one of the frames relative to the other.

3. A cotton chopper comprising two hingedly connected frames capable of independent swinging movement, a traction wheel carried by one of the frames, a movable chopper element carried by the second frame, coacting means carried by both of the frames whereby the chopper element is operated from the traction wheel, a gauge element depending from the second frame, and a handle member carried by the second frame to afford manual means for swinging said second frame relative to the first named frame, said swinging movement serving to make inoperative the coacting means carried by both of the frames for operating the chopper element.

In testimony whereof I hereunto affix my signature.

JAMES ANDREW JOHNSON.